United States Patent
Zhao et al.

(10) Patent No.: US 10,897,514 B2
(45) Date of Patent: Jan. 19, 2021

(54) METHODS, DEVICES, AND COMPUTER PROGRAM PRODUCTS FOR PROCESSING TARGET DATA

(71) Applicant: EMC IP Holding Company LLC, Hopkinton, MA (US)

(72) Inventors: Junping Zhao, Beijing (CN); Kun Wang, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 16/422,535

(22) Filed: May 24, 2019

(65) Prior Publication Data
US 2020/0137184 A1 Apr. 30, 2020

(30) Foreign Application Priority Data
Oct. 31, 2018 (CN) .......................... 2018 1 1290955

(51) Int. Cl.
*H04L 29/08* (2006.01)
*G06F 9/54* (2006.01)
(Continued)

(52) U.S. Cl.
CPC .............. *H04L 67/28* (2013.01); *G06F 9/542* (2013.01); *G06K 9/6231* (2013.01);
(Continued)

(58) Field of Classification Search
None
See application file for complete search history.

(56) References Cited

U.S. PATENT DOCUMENTS

2009/0189896 A1* 7/2009 Jiao ........................... G06T 1/60
345/426
2014/0297594 A1* 10/2014 Chtrasberg .............. G06F 9/445
707/643
(Continued)

OTHER PUBLICATIONS

L. Luo et al., "Parameter Hub: High Performance Parameter Servers for Efficient Distributed Deep Neural Network Training," arXiv:1801.09805v1, Jan. 30, 2018, 5 pages.
(Continued)

*Primary Examiner* — Viet D Vu
(74) *Attorney, Agent, or Firm* — Ryan, Mason & Lewis, LLP (57) ABSTRACT

A target data processing method comprises: in response to receiving, from a client, a request for processing target data, obtaining, at a server and from a storage device, the target data, the target data being predetermined to be obtained by the client from the storage device and a first set of operations being predetermined to be performed on the target data; and processing, at the server, the target data by performing the first set of operations on the target data such that at least one dedicated processing resource of the server performs, on the processed target data, a second set of operations associated with the first set of operations. As such, the data moving path may be shortened significantly, the network traffic pressure may be reduced significantly, the efficiency of the target data processing system may be improved, and moreover, the number of dedicated processing resources in the server may be easily scaled.

18 Claims, 9 Drawing Sheets

(51) Int. Cl.
*G06K 9/62* (2006.01)
*H04L 29/06* (2006.01)

(52) U.S. Cl.
CPC ............ *G06K 9/6257* (2013.01); *H04L 67/34* (2013.01); *H04L 67/42* (2013.01)

(56) References Cited

U.S. PATENT DOCUMENTS

| | | | | |
|---|---|---|---|---|
| 2017/0068889 | A1* | 3/2017 | Fougner | G06N 3/10 |
| 2017/0124729 | A1* | 5/2017 | Gu | G06T 1/20 |
| 2017/0371676 | A1* | 12/2017 | Weiser | G06F 15/80 |
| 2018/0189674 | A1* | 7/2018 | Hillard | G06Q 40/04 |
| 2019/0052634 | A1* | 2/2019 | Bhatia | H04L 9/0866 |
| 2019/0392312 | A1* | 12/2019 | Liu | G06K 9/4642 |
| 2020/0027210 | A1* | 1/2020 | Haemel | G16H 30/20 |

OTHER PUBLICATIONS

Victor Fong, "Enabling GPU-as-a-Service in Cloud Foundry," https://delltechnologiesworldonline.com/2017/connect/sessionDetail.ww?SESSION_ID=3433, 2017, 1 page.

Fei Chen; "X-as-a-Service (XaaS): Optimizing the Utilization of Hardware Accelerators," https://delltechnologiesworldonline.com/2018/connect/sessionDetail.ww?SESSION_ID=4356, 2018, 1 page.

Github, "Tensorflow Benchmarks: A Benchmark Framework for Tensorflow," https://github.com/tensorflow/benchmarks, downloaded May 24, 2019, 1 page.

Ryan Allred, "Image Augmentation for Deep Learning Using Keras and Histogram Equalization," https://towardsdatascience.com/image-augmentation-for-deep-learning-using-keras-and-histogram-equalization-9329f6ae5085, Jul. 10, 2017, 14 pages.

\* cited by examiner

METHODS, DEVICES, AND COMPUTER PROGRAM PRODUCTS FOR PROCESSING TARGET DATA

RELATED APPLICATION(S)

The present application claims priority to Chinese Patent Application No. 201811290955.X, filed Oct. 31, 2018, and entitled "Methods, Devices, and Computer Program Products for Processing Target Data," which is incorporated by reference herein in its entirety.

FIELD

Embodiments of the present disclosure generally relate to the field of data processing, and more specifically, to methods, devices, and computer program products for processing target data.

BACKGROUND

Artificial intelligence (e.g., machine learning and deep learning) has been widely developed, and numbers of artificial intelligence and deep learning applications have been deployed. In practice, deep learning usually needs to perform pre-processing operations to mass data. A traditional deep learning system architecture may comprise multiple clients and multiple servers. Clients may also be referred to as client nodes, and each client may comprise a central processing unit (CPU) and thus is provided with computing capabilities. Servers may also be referred to as server nodes, and each server may comprise a central processing unit and dedicated processing resources, such as graphic processing units (GPUs). Clients and servers may be connected via a network, such that features like remote dedicated processing resource access over network, fine-grained dedicated processing resource sharing etc. may be provided to clients. Further, dedicated processing resource utilization may be improved, total cost of ownership may be reduced, and dedicated processing resources are made easier to scale.

In the traditional deep learning system architecture, a client needs to read raw datasets from a storage device, and a central processing unit in the client processes these raw data (also referred to as pre-processing). Then, processed raw datasets are provided to dedicated processing resources in the server to be used for training. However, with the development of deep learning technology, the traditional deep learning system architecture needs to process more and more data. Since tremendous amounts of data needs to be transmitted between the client and the server, training delay may be caused. In addition, since the client needs to process a huge amount of data, it tends to be a bottleneck in deep learning training. As a result, the data processing efficiency is rather limited, and further the traditional deep learning architecture does not perform adequately.

SUMMARY

Embodiments of the present disclosure provide methods, devices, and computer program products for processing target data.

In a first aspect of the present disclosure, provided is a method of processing target data. The method comprises: in response to receiving, from a client, a request for processing target data, obtaining, at a server and from a storage device, the target data, the target data being predetermined to be obtained by the client from the storage device and a first set of operations being predetermined to be performed on the target data; and processing, at the server, the target data by performing the first set of operations on the target data such that at least one dedicated processing resource of the server performs, on the processed target data, a second set of operations associated with the first set of operations.

In a second aspect of the present disclosure, provided is a method of processing target data. The method comprises: determining, at a client, whether target data is to be processed, the target data being predetermined to be obtained by the client from the storage device and a first set of operations being predetermined to be performed on the target data; and in response to determining that the target data is not to be processed, sending, from the client to a server, a request for processing target data, such that the server obtains the target data from the storage device and performs the first set of operations on the target data.

In a third aspect of the present disclosure, provided is a device for processing target data. The device comprises: at least one processing unit; at least one memory coupled to the at least one processing unit and storing instructions to be executed by the at least one processing unit, the instructions, when being executed by the at least one processing unit, causing the device to perform acts comprising: in response to receiving, from a client, a request for processing target data, obtaining, at a server and from a storage device, the target data, the target data being predetermined to be obtained by the client from the storage device and a first set of operations being predetermined to be performed on the target data; and processing the target data by performing the first set of operations on the target data such that at least one dedicated processing resource of the server performs, on the processed target data, a second set of operations associated with the first set of operations.

In a fourth aspect of the present disclosure, provided is a device for processing target data. The device comprises: at least one processing unit; at least one memory coupled to the at least one processing unit and storing instructions to be executed by the at least one processing unit, the instructions, when being executed by the at least one processing unit, causing the device to perform acts comprising: determining whether target data is to be processed, the target data being predetermined to be obtained by the client from the storage device and a first set of operations being predetermined to be performed on the target data; and in response to determining that the target data is not to be processed, sending a request for processing target data, such that the server obtains the target data from the storage device and performs the first set of operations on the target data.

In a fifth aspect of the present disclosure, provided is a computer program product. The computer program product is tangibly stored on a non-transient computer readable medium and comprising machine executable instructions which, when being executed, causing a machine to perform steps of the method according to the first aspect of the present disclosure.

In a sixth aspect of the present disclosure, provided is a computer program product. The computer program product is tangibly stored on a non-transient computer readable medium and comprising machine executable instructions which, when being executed, causing a machine to perform steps of the method according to the second aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the more detailed description of exemplary embodiments of the present disclosure with reference to the accompanying drawings, the above and other objects, features and advantages of the present disclosure will become more apparent, wherein the same reference numerals typically represent the same components in the example embodiments of the present disclosure.

Throughout the figures, the same or corresponding numerals denote the same or corresponding parts.

DETAILED DESCRIPTION

Some preferred embodiments will be described in more detail with reference to the accompanying drawings, in which the preferred embodiments of the present disclosure have been illustrated. However, the present disclosure can be implemented in various manners, and thus should not be construed to be limited to embodiments disclosed herein. On the contrary, those embodiments are provided for the thorough and complete understanding of the present disclosure, and for completely conveying the scope of the present disclosure to those skilled in the art.

The terms "comprise" and its variants used here are to be read as open terms that mean "include, but is not limited to." Unless otherwise specified, the term "or" is to be read as "and/or." The term "based on" is to be read as "based at least in part on". The terms "one example embodiment" and "one embodiment" are to be read as "at least one embodiment." The term "another embodiment" is to be read as "at least one other embodiment." The terms "first," "second" and the like may refer to different or the same objects. Other definitions, explicit and implicit, might be included below.

As described in the Background, the traditional deep learning system architecture needs to process more and more data. Since tremendous amounts of data needs to be transmitted between the client and the server, training delay may be caused. In addition, since the client needs to process huge amounts of data, it tends to be a bottleneck in deep learning training. As a result, the data processing efficiency is rather limited, and further the traditional deep learning architecture does not perform adequately. Specifically, dedicated processing resources (like graphics processing units), as one of important components for deep learning, enable powerful computing capabilities, especially for float datasets and parallel data processing. However, existing dedicated processing resources have some limitations in a typical data center or cloud environment.

First of all, dedicated processing resources have high cost but low utilization, which will lead to higher total cost of ownership. This is because dedicated processing resources in the traditional solution can hardly be shared. Meanwhile, dedicated processing resources in the traditional solution are difficult to scale, so extra configuration will be needed for possible implementation. In addition, in the traditional solution, dedicated processing resources relate to cluster wide monitoring and job scheduling, so they are quite complicated in terms of management. Finally, in the traditional solution, dedicated processing resources lack advanced enterprise level features, such as migration, checkpoint, etc.

Figure 1:
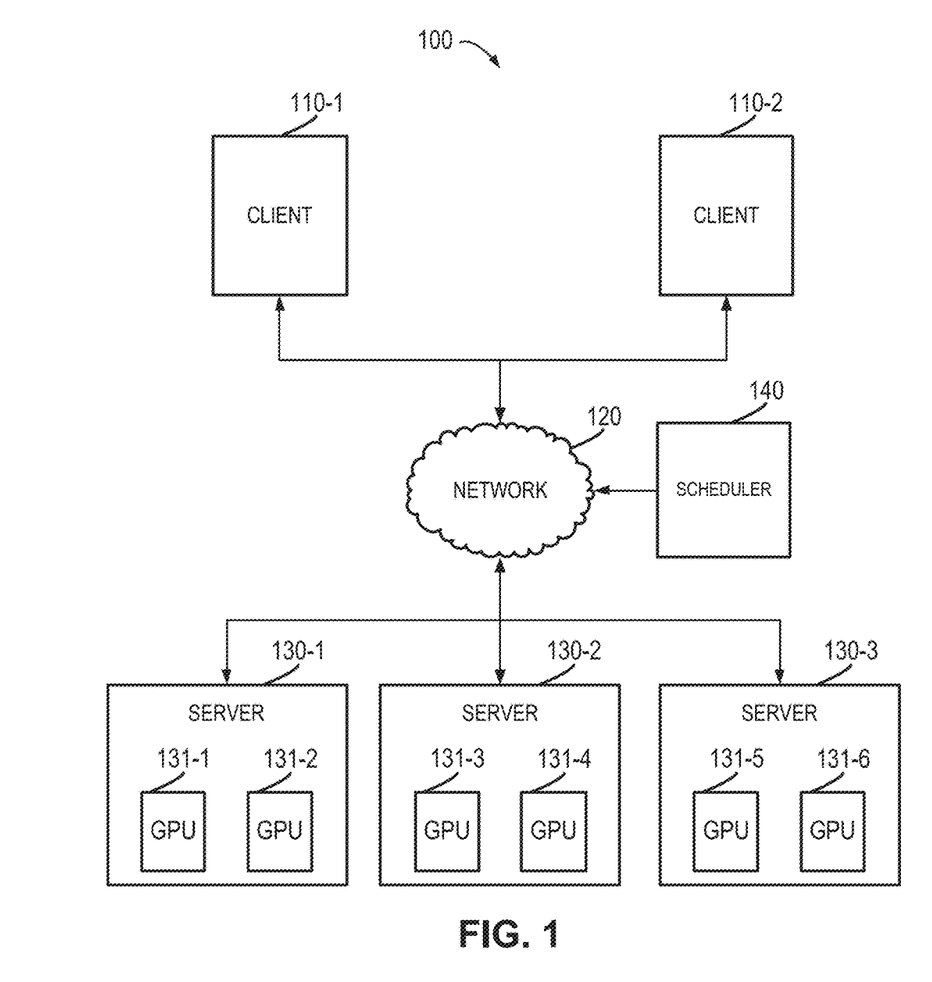
FIG. 1 shows a schematic view of a client-server architecture for processing target data in a traditional solution.

FIG. 1 shows a schematic view of a client-server architecture 100 for target data processing in traditional solutions. As depicted, the client-server architecture 100 for target data processing may be a distributed client-server architecture, which comprises: two clients 110-1 and 110-2 (collectively referred to as client 110); a network 120; three servers 130-1, 130-2 and 130-3 (collectively referred to as server 130); as well as a scheduler 140. The server 130-1 comprises two graphics processing units 131-1 and 131-2, the server 130-2 comprises two graphics processing units 131-3 and 131-4, and the server 130-3 comprises two graphics processing units 131-5 and 131-6. These six graphics processing units may be collectively referred to as graphics processing unit 131, which jointly form a graphics processing unit pool in the client-server architecture 100.

In the client-server architecture 100, the client 110 and the server 130 are connected via the network 120, and the scheduler 140 is also connected to the network 120 so as to schedule use requests of the client 110 for the graphics processing unit 131 in the server 130 as well as other data and communication. Therefore, the network 120 may affect the scheduling and communication with various techniques, including the Transmission Control Protocol (TCP), remote direct memory access (RMDA), etc.

The client-server architecture 100 for target data processing in the traditional solution is mainly used to optimize the use of the graphics processing unit 131 in the server 130, which makes various resources in the server 130 be transparent to the client 110, such that the client 110 may access and share the graphics processing unit 131 over the network 120. In addition, the client-server architecture 100 may further provide fine-grained graphics processing unit resource management, cross-server 130 graphics processing unit aggregation as well as intelligent scheduling of graphics processing units.

It should be understood though not shown in FIG. 1, both the client 110 and the server 130 may comprise a central processing unit, which may be used to process data. Further, it should be understood the number of each element in the client-server architecture 100 shown in FIG. 1 is merely exemplary, and the scope of the present disclosure is not limited in this regard.

Figure 2:
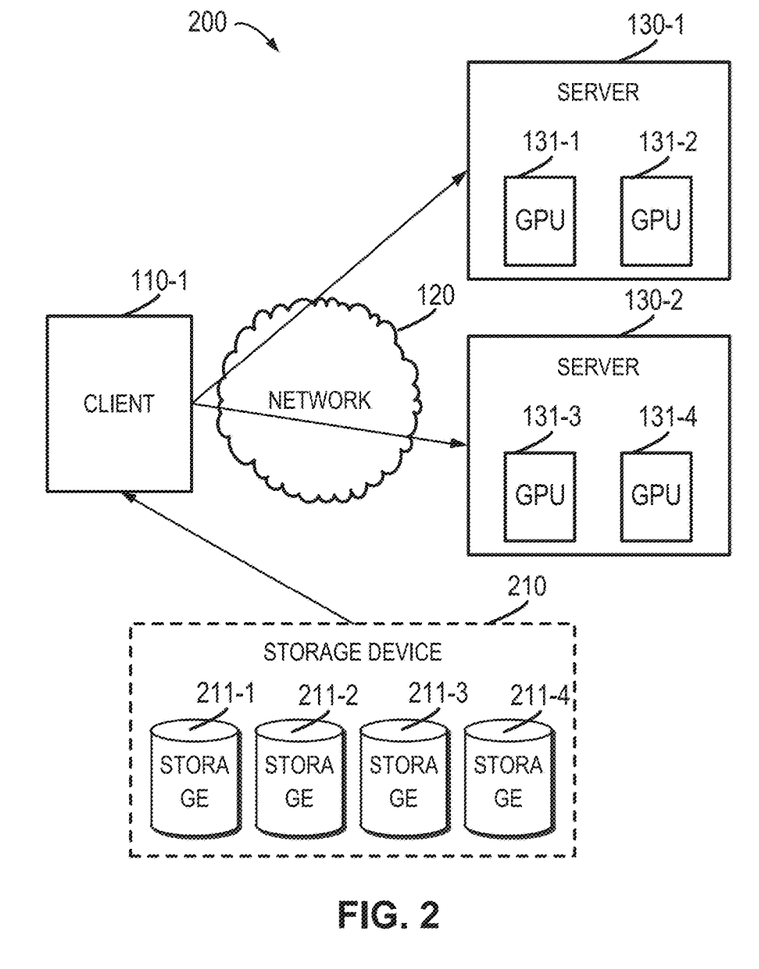
FIG. 2 shows a schematic view of a target data processing system in a traditional solution.

FIG. 2 shows a schematic view of a target data processing system 200 in traditional solutions. As depicted, the target data processing system 200 comprises the client 110-1, the network 120, the servers 130-1 and 130-2 which are shown in FIG. 1, as well as a storage device 210 which is not shown in FIG. 1. The storage device 210 comprises four storage 211-1, 211-2, 211-3 and 211-4 (collectively referred to as storage 211).

In the target data processing system 200 shown in FIG. 2, the storage device 210 (and also the storage 211 therein) is used to store a raw dataset to be processed (e.g., processed by a central processing unit in the client 110-1 so as to be used by the graphics processing units 131-1, 131-2, 131-3 and 131-4 in the servers 130-1 and 130-2 for the training purpose). Content of the raw dataset may be images and read by the client 110-1 from the storage device 210 (as shown by an arrow leading from the storage device 210 to the client 110-1).

When the target data processing system 200 is used for typical (distributed) deep leaning training, at each training iteration (each mini-batch for to-be-trained data), the client 110-1 will read a raw dataset from the storage device 210, and the central processing unit in the client 110-1 performs various ETL (extract, transform, load) operations to the read raw dataset, such as shuffling, decoding, and re-sizing, followed by data augmentations. The raw dataset processed as such is finally fed (in tensor or N-dim array) via the network 120 into the servers 130-1 and 130-2 so as to be used by the graphics processing units 131-1, 131-2, 131-3 and 131-4 for training.

It should be understood though not shown in FIG. 2, both the client 110-1 and the servers 130-1, 130-2 may comprise a central processing unit, which may be used to process data. Further, it should be understood only showing one client 110-1 and two servers 130-1 and 130-2 in the target data processing system 200 in FIG. 2 serves a purpose of simplifying the figure, so the number of each element in the target data processing system 200 shown in FIG. 2 is merely exemplary and the scope of the present disclosure is not limited in this regard.

For typical (distributed) deep learning training, the size of each image in raw datasets for training may be larger than hundreds of KB. When the four graphics processing units 131-1, 131-2, 131-3 and 131-4 in the servers 130-1 and 130-2 are used for training, 16 images may be comprised in each training iteration batch, and usually more than ten thousand training iterations may be performed. At this point, the processed raw datasets which need to be transmitted from the client 110-1 to the servers 130-1 and 130-2 via the network 120 might comprise data of hundreds of GB, and over 20 central processing unit cores will be used in processing these raw datasets in the client 110-1 only.

Apparently, distributed deep learning training is both computation and communication intensive. Meanwhile, various ETL (extract, transform and load) operations performed by the central processing unit in the client 110-1 to read raw datasets are very important on the target data processing system 100. For example, some graphics processing units 131 might only accept specific image shape as input. Meanwhile, the augmentation operation is also critical to the graphics processing unit 131 for the training operation, otherwise some graphics processing units 131 might only work perfectly to the samples trained by themselves but are much worse for new data that is never seen.

The client-server architecture 100 for target data processing and the target data processing system 200 in traditional solutions have been described in conjunction with FIGS. 1 and 2. Although traditional solutions may be applicable to data processing, they contain many deficiencies.

As shown in FIG. 2, raw datasets are first read by the client 110-1 from the storage device 210 and then transmitted from the client 110-1 to the servers 130-1 and 130-2 over the network 120, thereby having a long data moving path. At this point, big network traffic pressure will be brought by moving data. Meanwhile, a delay of data transmission might be caused due to the network traffic pressure, so the graphics processing units 131-1, 131-2, 131-3 and 131-4 at the servers 130-1 and 130-2 are unable to provide processed raw datasets in time, and further a delay in the target data processing system 200 processing data will be caused. In addition, due to the limitation of available resources of the central processing unit at the client 110-1, even if more graphics processing units at the servers 130-1 and 130-2 or the client 110-1 obtain the use right over more graphics processing units by being connected to more servers 130, these more graphics processing units still cannot be fully utilized for training with processed raw datasets. This is because the central processing unit at the client 110-1 fails to provide enough processed raw datasets in time. In consequence, the client 110-1 tends to be a bottleneck in the target data processing system 200 processing data.

Description has been presented to the client-server architecture 100 for target data processing and the target data processing system 200 in traditional solutions with reference to FIGS. 1 and 2.

In order to at least partly overcome the above problems in traditional solutions, embodiments of the present disclosure propose a method of processing target data. According to embodiments of the present disclosure, provided is a smart pipeline with parallel data loading and processing capabilities, which can fit client-server architectures such that raw datasets for training can be quickly read by at least one server from a local or shared storage device and processed (pre-processed) at these servers so as to be used by graphics processing units in servers for training operations. In the above procedure, the client is no longer used to read and process raw datasets but is mainly used to coordinate a given training job (and training data).

Figure 3:
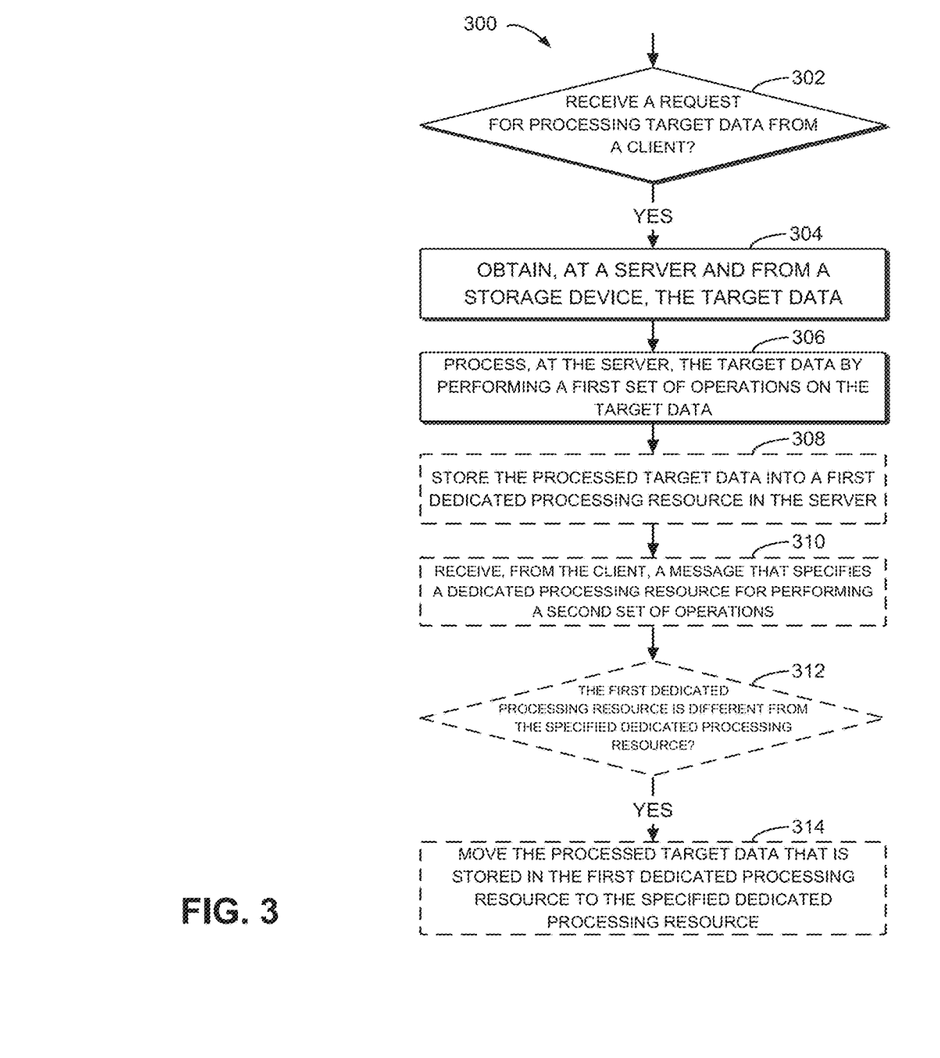
FIG. 3 shows a flowchart of a method for processing target data according to embodiments of the present disclosure.
Figure 4:
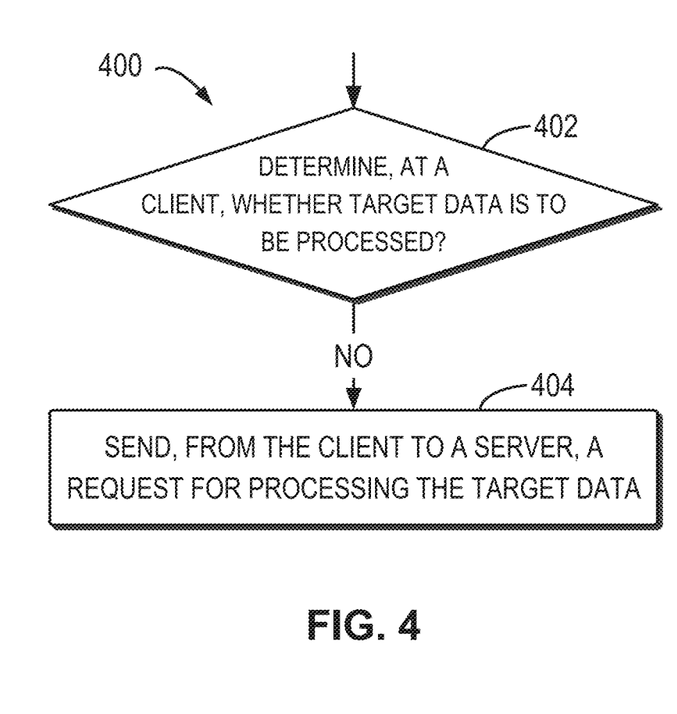
FIG. 4 shows a flowchart of a method for processing target data according to embodiments of the present disclosure.

With reference to FIGS. 3 and 4, detailed description is presented below to specific flows and operations of methods 300 and 400 for processing target data according to embodiments of the present disclosure.

Embodiments of the present disclosure mainly focus on, during deep learning, processing (pre-processing) data by a processing unit like a central processing unit in a server, rather than specific pre-processing steps and training with processed data by dedicated processing resources in the server. Therefore, the deep learning system in the present disclosure may also be regarded as a data processing system. The data processing system mentioned in the present disclosure may comprise an artificial intelligence system, a machine learning system, a deep learning system and other system for processing data.

In addition, as described above, dedicated processing resources may be provided as various implementation forms, wherein graphics processing units are a typical example of dedicated processing resources. In the present disclosure, to illustrate specific examples in detail, graphics processing units are taken as an example for describing the technical solution. However, such illustration is merely exemplary, and the technical solution of the present disclosure may be applicable to any dedicated processing resources rather than being limited to graphics processing units.

Figure 5:
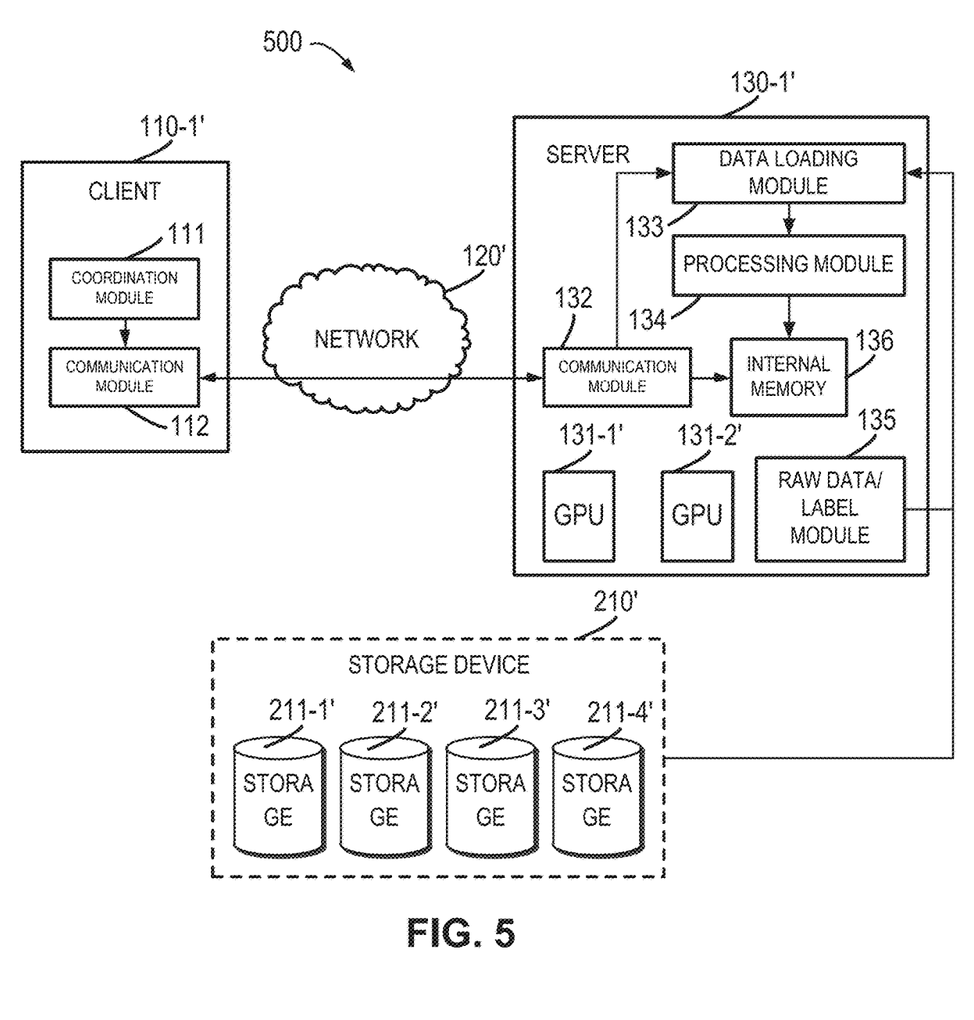
FIG. 5 shows a schematic view of a target data processing system according to embodiments of the present disclosure.

FIG. 3 shows a flowchart of a method 300 for processing target data according to embodiments of the present disclosure. The method 300 for processing target data is to be described from the perspective of a server 130-1' in a target data processing system 500 according to embodiments of the present disclosure as shown in FIG. 5 below. Specifically, the method may be performed by the server 130-1' or other appropriate device. It should be understood the method 300 may further comprise an additional step which is not shown and/or omit a step which is shown, the scope of the present disclosure is not limited in this regard.

At block 302, the server 130-1' determines whether a request for processing target data is received from a client 110-1' in the target data processing system 500 according to embodiments of the present disclosure shown in FIG. 5. According to embodiments of the present disclosure, the client 110-1' is predetermined to obtain the target data from a storage device 210' in the target data processing system 500 according to embodiments of the present disclosure shown in FIG. 5 and perform a first set of operations on the target data, wherein the first set of operations may comprise various ETL operations, such as shuffling, decoding, re-sizing etc., and may comprise data augmentation, including sample-wise standardization, feature-wise standardization, whitening, random rotation, shifts, shear and flips, dimension reordering, etc. As seen from the operation at block 302, the method 300 for processing target data starts with the client 110-1' launching a new data processing (training) job. When the server 130-1' determines at block 302 the request for processing the target data is received from the client 110-1', the method 300 proceeds to block 304.

At block 304, at the server 130-1' the target data is obtained from the storage device 210'. According to embodiments of the present disclosure, the storage device 210' may be locally located at the server 130-1' or may be a remote distributed memory relative to the server 130-1', and the scope of the present disclosure is not limited in this regard.

According to embodiments of the present disclosure, the request sent by the client 110-1' to the server 130-1' not only indicates the server 130-1' processes the target data but also comprises other information, such as a storage position (e.g., data URI or uniform resource indicator) of the target data (raw dataset), designation of a server for processing the target data and a graphics processing unit in the server, information on batch processing of the target data (e.g. a batch processing solution for the target data), and information on operations performed on the target data, etc. Specifically, the request sent by the client 110-1' to the server 130-1' may designate operation items comprised in the first set of operations, a graphics processing unit for processing the target data as well as a batch processing solution for the target data.

At block 306, the server 130-1' processes the target data by performing the first set of operations on the target data at the server 130-1'. After the server 130-1' performs the first set of operations on the target data, the processed target data may be used by at least one graphics processing unit of graphics processing units 131-1' and 131-2' in the server 130-1' in the target data processing system 500 according to embodiments of the present disclosure shown in FIG. 5. That is, the at least one graphics processing unit of the graphics processing units 131-1' and 131-2' performs a second set of operations, which is associated with the first set of operations, to the processed target data, e.g. training. It is noteworthy since the training of the processed target data has requirements on parameters of the target data such as the format, the first set of operations performed on the target data need to cooperate with subsequent training (i.e. second set of operations). Therefore, the first set of operations is associated with the second set of operations.

As described above, the request sent by the client 110-1' to the server 130-1' may designate operation items comprised in the first set of operations, so the server 130-1' may determine the first set of operations from the request. In addition, according to embodiments of the present disclosure, the server 130-1' may also obtain from the target data processing system 500 a predefined set of operations for the target data which is created during building the target data processing system 500, as the first set of operations. At this point, the request sent by the client 110-1' to the server 130-1' may not designate operation items comprised in the first set of operations.

Likewise, as described above, the request sent by the client 110-1' to the server 130-1' may designate a graphics processing unit for processing the target data, so the server 130-1' may determine the at least one graphics processing unit from the request. In addition, according to embodiments of the present disclosure, the server 130-1' may also obtain from the target data processing system 500 pre-specified at least one graphics processing unit which is created during building the target data processing system 500, as the at least one graphics processing unit for processing the target data. At this point, the request sent by the client 110-1' to the server 130-1' may not designate a graphics processing unit for processing the target data.

Further, as described above, the request sent by the client 110-1' to the server 130-1' may designate information on batch processing of the target data. According to embodiments of the present disclosure, the information on batch processing of the target data may be referred to as coordination information, which may indicate a batch processing solution for the target data. At this point, the server 130-1' receives and processes the target data in batches based on the batch processing information. After processing the target data in batches, the server 130-1' synthesizes the batch-processed target data based on the above batch processing information and thus obtains the above processed target data. According to embodiments of the present disclosure, the batch-processed target data may also comprise separately processing different batches of the target data in different servers. In this case, each server may also coordinate the different batches of the processing of the target data and the batch-processed target data according to the coordination message which is included in a request for processing the target data as sent by the client 110-1' to these servers.

The method 300 for processing target data further comprises optional steps shown at dashed blocks 308, 310, 312 and 314.

At block 308, the server 130-1' stores the processed target data into a first dedicated processing resource (first graphics processing unit) in the server 130-1'. According to embodiments of the present disclosure, after the server 130-1' performs the first set of operations on the target data to obtain the processed target data, it may store the processed target data into a graphics processing unit in the server 130-1' which is selected at random or specified in advance.

At block 310, the server 130-1' receives from the client 110-1' a message designating a dedicated processing resource (graphics processing unit) for performing the second set of operations to the processed target data. According to embodiments of the present disclosure, the step at block 310 is directed to the circumstance where the request for processing the target data as received by the server 130-1' from the client 110-1' at blocks 302 and 304 does not designate a dedicated processing resource for performing the second set of operations to the processed target data; otherwise the processed target data may be directly stored to a specified graphics processing unit at block 308.

At block 312, the server 130-1' determines whether the first dedicated processing resource mentioned at block 308 is different from the specified dedicated processing resource mentioned at block 310; if yes, the method 300 proceeds to block 314.

At block 314, the server 130-1' moves the processed target data, which are stored in the first dedicated processing resource, to the specified dedicated processing resource mentioned at block 310 so as to be used in performing the second set of operations.

With the optional steps shown at blocks 308 to 314, since the processed target data is stored in a certain dedicated processing resource, at which point the server 130-1' may continue to read next-batch target data from the storage device 210' for processing, such that the data processing efficiency of the target data processing system 500 is improved. In particular, the speed that the server 130-1' moves data from one dedicated processing resource to another dedicated processing resource may be as high as 500-700 GB/second, such that almost no data moving delay will be caused.

FIG. 4 shows a flowchart of a method 400 for processing target data according to embodiments of the present disclosure. The method 400 for processing target data is to be described from the perspective of a client 110-1' in a target data processing system 500 according to embodiments of the present disclosure as shown in FIG. 5 below. Specifically, the method may be performed by the client 110-1' or other appropriate device. It should be understood the method 400 may further comprise an additional step which is not shown and/or omit a step which is shown, the scope of the present disclosure is not limited in this regard.

At block 402, it is determined at the client 110-1' whether target data need to be processed. According to embodiments of the present disclosure, the target data is predetermined to be obtained by the client from a storage device, to which a first set of operations is predetermined to be performed. Moreover, determining at the client 110-1' whether the target data need to be processed may comprise starting a new deep leaning task at the client 110-1' so as to determine the target data to be processed. Concepts of the target data and the first set of operations involved at block 402 correspond to those in the method 300 for processing target data, which is not detailed here. When at block 402 it is determined at the client 110-1' the target data need to be processed, the method 400 proceeds to block 404.

At block 404, the client 110-1' sends a request for processing target data into the server 130-1'. According to embodiments of the present disclosure, the request may cause the server 130-1' to obtain the target data from the storage device 210' and perform the first set of operations on the target data. The operation involved at block 404 corresponds to that in the method 300 for processing target data, which is not detailed here.

In addition, the method 400 for processing target data may further comprise some additional steps, such as sending from the client 110-1' to the server 130-1' a coordination message that indicates batch processing of the target data, and sending from the client 110-1' to the server 130-1' a message that specifies a dedicated processing resource for performing a second set of operations associated with the first set of operations to the processed target data. Operations of these steps correspond to those in the method 300 for processing target data, which is not detailed here.

FIG. 5 shows a schematic view of a target data processing system 500 according to embodiments of the present disclosure. Specific flows and operations of the methods 300 and 400 for processing target data according to embodiments of the present disclosure as described with reference to FIGS. 3 and 4 may be performed by the client 110-1', the server 130-1' or other appropriate device in the target data processing system 500.

As shown in FIG. 5, the data processing system 500 comprises the client 110-1', a network 120', the server 130-1' and the storage device 210'. The functions of the network 120' and the storage device 210' are similar to those of the network 120 and the storage device 210 described with reference to FIGS. 1 and 2, which is not detailed here. The client 110-1' comprises a coordination module 111 and a communication module 112. The coordination module 111 is used to effect coordinated related operations in the methods 300 and 400 for processing target data according to embodiments of the present disclosure as described with reference to FIGS. 3 and 4, and may also control and manage coordination operations such as negotiation and exchange with the server 130-1' and the storage device 120' with respect to a training job launched from the client 110-1. The communication module 112 is used to communicate with the server 130-1' via the network 120'. The server 130-1' comprises graphics processing units 131-1' and 131-2', a communication module 132, a data loading module 133, a processing module 134, a raw data/label module 135 and an internal memory 136. The communication module 132 is used to communicate with the client 110-1' (specifically, the communication module 112 at the client 110-1') via the network 120'. The data loading module 133 is used to load target data (raw dataset) from the storage device 210', obtain raw data/label from the raw data/label module 135 within the server 130-1' and load the target data into the processing module 134. The processing module 134 is used to perform the first set of operations on the target data that is loaded by the data loading module 133 from the storage device 210'. The raw data/label module 135 is used to store raw data/label so as to determine whether the processed target data meet a predetermined requirement. The internal memory 136 is used to store the target data that is processed by the processing module 134 and other data from the communication module 132 that need to be stored.

With the various components shown in FIG. 5, it is possible to effect specific flows and operations of the methods 300 and 400 for processing target data according to embodiments of the present disclosure as described with reference to FIGS. 3 and 4.

Flows of the methods 300 and 400 for processing target data and respective modules of the target data processing system 500 have been described with reference to FIGS. 3 to 5. It should be understood the above description is intended to better present the content of the preset disclosure rather than limiting in any manner.

Figure 6A:
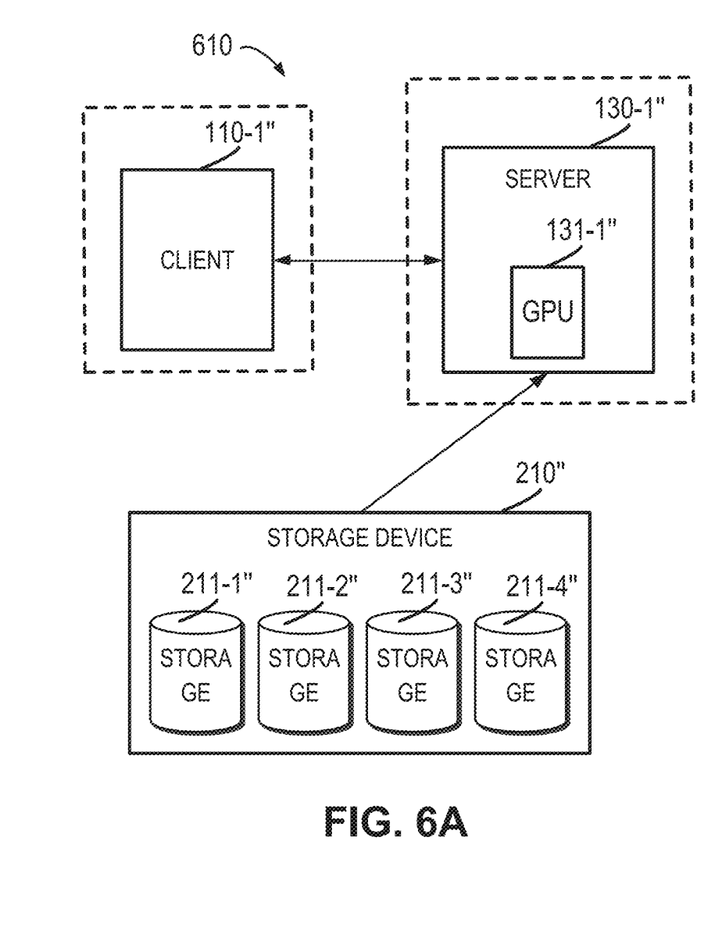
FIGS. 6A to 6C show schematic views of different types of target data processing systems in which embodiments of the present disclosure may be applied.
Figure 6B:
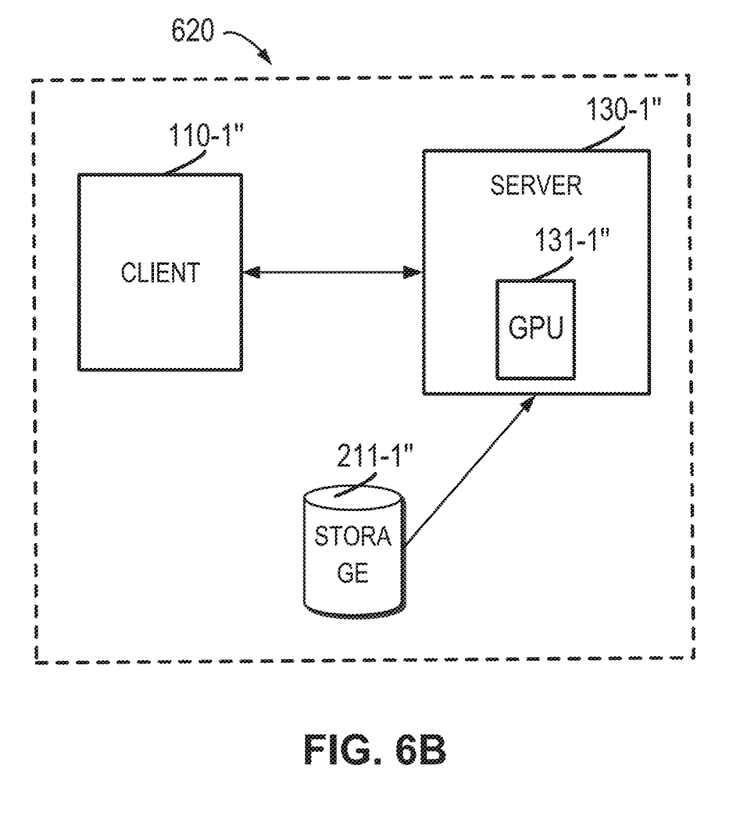
Figure 6C:
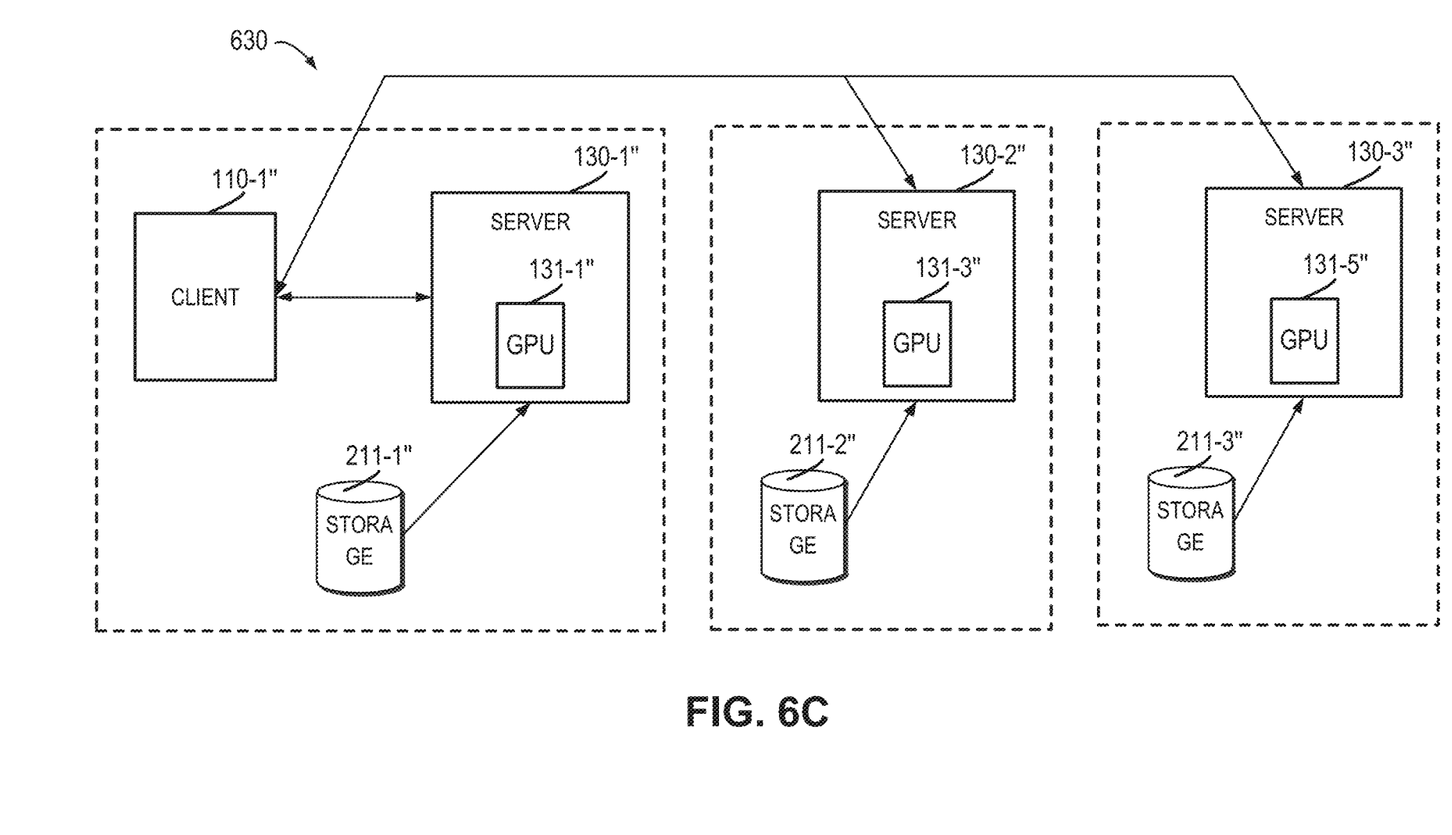

FIGS. 6A to 6C (collectively referred to as FIG. 6) show different types of target data processing systems in which embodiments of the present disclosure may be applied.

A target data processing system 610 shown in FIG. 6A comprises a client 110-1", a server 130-1" (comprising a graphics processing unit 131-1") and a storage device 210" (comprising storage 211-1", 211-2", 211-3" and 211-4"). In FIG. 6A, the client 110-1" and the server 130-1" are surrounded by different dashed boxes, which means they are remotely located at different geographical positions. The storage device 210" may be a distributed storage device. The target data processing system 610 shown in FIG. 6A is a typical type to which embodiments of the present disclosure may be applied. The reduction of the processing efficiency of the target data processing system 610 caused by network transmission may be improved significantly.

A target data processing system 620 shown in FIG. 6B comprises a client 110-1", a server 130-1" (comprising a graphics processing unit 131-1") and storage 211-1". In FIG. 6B, the client 110-1", the server 130-1" and the storage 211-1" are surrounded by a single dashed box, which means they are located at the same position. In this case, since there is no network transmission, although embodiments of the present disclosure still may be applied, the improvement of the processing efficiency of the target data processing system 610 is not so obvious.

A target data processing system 630 shown in FIG. 6C comprises a client 110-1", a server 130-1" (comprising a graphics processing unit 131-1"), a server 130-2" (comprising a graphics processing unit 131-3"), a server 130-31" (comprising a graphics processing unit 131-5"), and processing means 211-1", 211-2" and 211-3". In FIG. 6B, different dashed boxes represent different geographical positions. Thereby, the client 110-1", the server 130-1" and the processing means 211-1" are located at the same geographical position (just as shown in FIG. 6B), the server 130-2" and the storage 211-2" are located at the same geographical position, and the server 130-3" and the storage 211-3" are located at the same geographical position. In this case, since network transmission is involved, the reduction of the processing efficiency of the target data processing system 630 caused by network transmission may be improved significantly with embodiments of the present disclosure.

As seen from tests, with embodiments of the present disclosure, data that used to be transmitted between the client and the server are reduced from several GBs to several KBs. Specifically, by means of embodiments of the present disclosure, regarding a single graphics processing unit, with the slow 1 GB networking speed between the client and the server the number of images processed per second may be increased by 22%-84% and even three times (for different types of data processing systems); with the typical 10 GB networking speed between the client and the server, the number of images processed per second may be increased by 6%-10% (for different types of data processing systems). In addition, regarding multiple graphics processing units (e.g. four) and in a scenario of loading target data from a local storage device, with the typical 10 GB networking speed between the client the server, the number of images processed per second may be increased by 30%-34% (for different types of data processing systems); regarding multiple graphics processing units (e.g. four) and in a scenario of loading target data from an NFS shared storage device at speed of 10 GB, with the typical 10 GB networking speed between the client and the server, the number of images processed per second may be increased by 30%-32% (for different types of data processing systems). Even with the higher 100 GB networking speed between the client and the server, regarding multiple graphics processing units (e.g. four) and in a scenario of loading target data from a local storage device, the number of images processed per second may be increased by 18%-21% (for different types of data processing systems).

As seen from the above description with reference to FIGS. 1 to 6 in conjunction with the above data, the technical solution according to embodiments of the present disclosure has many advantages over the traditional solution. First of all, by means of the technical solution according to embodiments of the present disclosure, the data moving path may be shortened significantly, and the network traffic pressure may be reduced significantly. Meanwhile, since the network traffic pressure is reduced, processed raw data may be provided in time to the dedicated processing resource in the server, the delay in an original processing system processing data may be avoided, and further the efficiency of the target data processing system may be improved. In addition, without the limitation of processing capabilities in the client, the number of dedicated processing resources in the server may be easily scaled. Furthermore, the computation of the technical solution according to embodiments of the present disclosure is not complex and easy to implement. Finally, the technical solution according to embodiments of the present disclosure will not affect other service on the data processing system.

Figure 7:
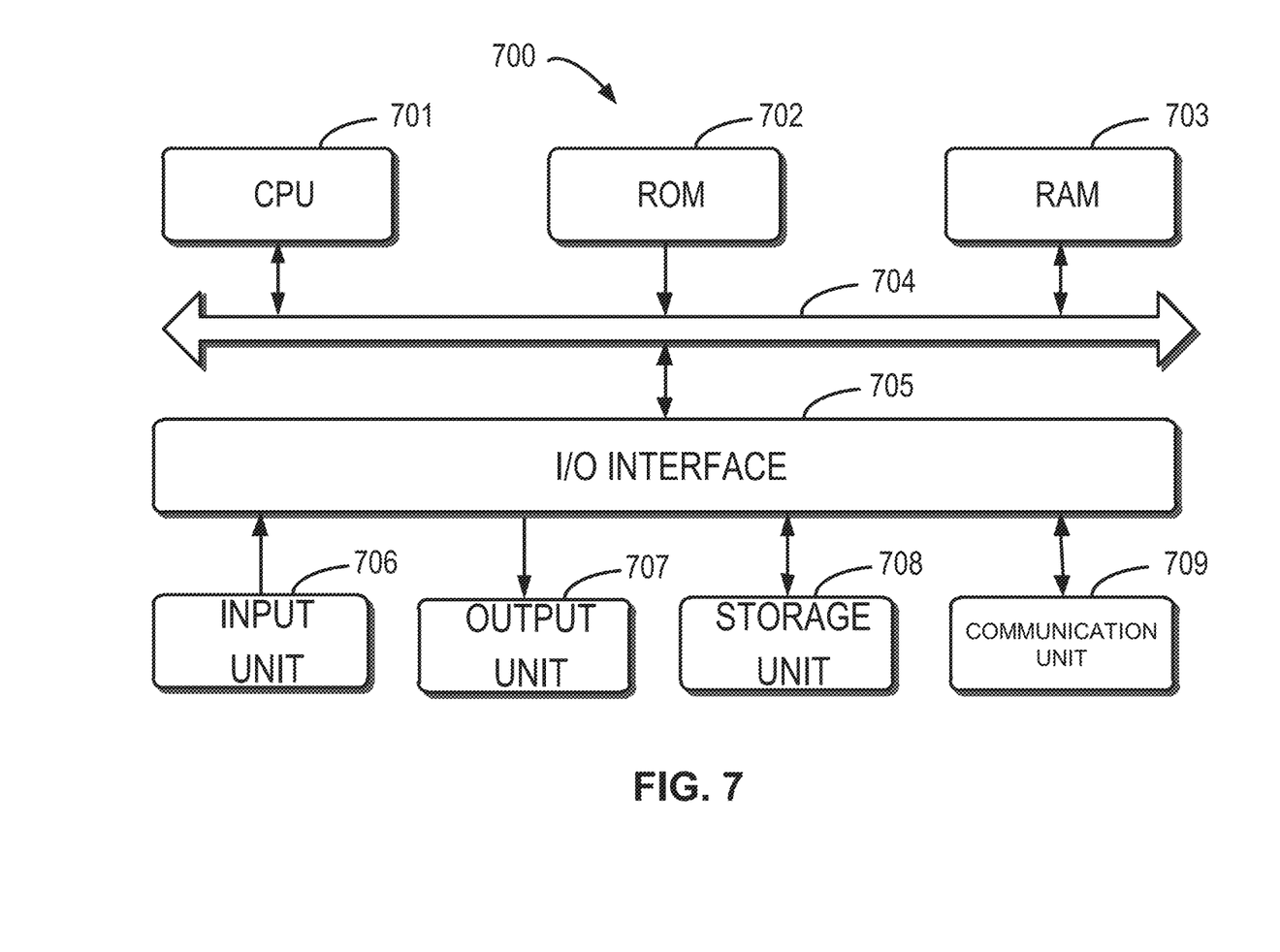
FIG. 7 shows a schematic block diagram of an example device which is applicable to implement embodiments of the present disclosure.

FIG. 7 shows a schematic block diagram of an example device 700 suitable for implementing embodiments of the present disclosure. As depicted, the device 700 comprises a central processing unit (CPU) 701 which is capable of performing various appropriate actions and processes in accordance with computer program instructions stored in a read only memory (ROM) 702 or computer program instructions loaded from a storage unit 608 to a random access memory (RAM) 703. In the RAM 703, there are also stored various programs and data required by the device 700 when operating. The CPU 701, the ROM 702 and the RAM 703 are connected to one another via a bus 704. An input/output (I/O) interface 705 is also connected to the bus 804.

Multiple components in the device 700 are connected to the I/O interface 705: an input unit 706 including a keyboard, a mouse, or the like; an output unit 707, such as various types of displays, a loudspeaker or the like; a storage unit 708, such as a disk, an optical disk or the like; and a communication unit 709, such as a LAN card, a modem, a wireless communication transceiver or the like. The communication unit 709 allows the device 700 to exchange information/data with other device via a computer network, such as the Internet, and/or various telecommunication networks.

The above-described procedures and processes (such as the methods 300 and 400) may be executed by the processing unit 701. For example, in some embodiments, the methods 300 and 400 may be implemented as a computer software program, which is tangibly embodied on a machine readable medium, e.g. the storage unit 708. In some embodiments, part or the entirety of the computer program may be loaded to and/or installed on the device 700 via the ROM 702 and/or the communication unit 709. The computer program, when loaded to the RAM 703 and executed by the CPU 701, may execute one or more acts of the methods 300 and 400 as described above.

The present disclosure may be a method, an apparatus, a system, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to embodiments disclosed. Many modifications and variations will be apparent to those of ordinary skill in the art without departing from the scope and spirit of the described embodiments. The terminology used herein was chosen to best explain the principles of embodiments, the practical application or technical improvement over technologies found in the marketplace, or to enable others of ordinary skill in the art to understand embodiments disclosed herein.

What is claimed is:

1. A method of processing target data by a server comprising a first processing device and a plurality of dedicated processing devices that are different than the first processing device, the method comprising:
    obtaining, from a client device, a request for processing target data for use in a machine learning operation, the request comprising an indication of at least one preprocessing process to be performed on the target data;
    based at least in part on the obtained request for processing the target data, obtaining the target data from a storage device, the storage device comprising a repository of data for use in machine learning operations;

performing the at least one pre-processing process on the target data using the first processing device of the server to generate pre-processed data;
storing the pre-processed target data into a first dedicated processing device of the plurality of dedicated processing devices;
determining that a given dedicated processing device of the plurality of dedicated processing devices is specified to perform the at least one machine learning operation on the pre-processed data;
moving the pre-processed target data from the first dedicated processing device to the given dedicated processing device based at least in part on the determination that the given dedicated processing device of the plurality of dedicated processing devices is specified to perform the at least one machine learning operation on the pre-processed data;
performing at least one machine learning operation on the pre-processed data using the given dedicated processing device of the server to generate machine learning output data; and
providing the generated machine learning output data to the client device.

2. The method according to claim 1, wherein:
the indication of the at least one pre-processing process to be performed on the target data comprises a coordination message, the coordination message indicating that a batch-processing scheme be performed on the target data; and
performing the at least one pre-processing process on the target data using the first processing device of the server to generate pre-processed data comprises processing, based at least in part on the batch-processing scheme, the target data in batches and synthesizing, based on the batch-processing scheme, the batch-processed target data.

3. The method according to claim 1, wherein the method further comprises:
receiving, from the client device, a message that specifies the given dedicated processing device of the plurality of dedicated processing devices for performing the at least one machine learning operation on the pre-processed data, wherein determining that the given dedicated processing device of the plurality of dedicated processing devices is specified to perform the at least one machine learning operation on the pre-processed data is based at least in part on the received message; and
determining that the first dedicated processing device is different than the given dedicated processing device, wherein the moving of the pre-processed data from the first dedicated processing device to the given dedicated processing device is based at least in part on the determination that the first dedicated processing device is different than the given dedicated processing device.

4. A computer program product being tangibly stored on a non-transient computer readable medium and comprising machine executable instructions which, when being executed, causing a machine to perform steps of the method according to claim 1.

5. A device for processing target data, comprising:
a first processing device;
a plurality of dedicated processing devices that are different than the first processing device;
at least one memory coupled to the first processing device and the dedicated processing devices and storing instructions to be executed by at least one of the first processing device and the dedicated processing devices, the instructions, when being executed by the at least one of the first processing device and the dedicated processing devices, causing the device to perform acts comprising:
obtaining, from a client device, a request for processing target data for use in a machine learning operation, the request comprising an indication of at least one pre-processing process to be performed on the target data;
based at least in part on the obtained request for processing the target data, obtaining the target data from a storage device, storage device comprising a repository of data for use in machine learning operations;
performing the at least one pre-processing process on the target data using the first processing device of the server to generate pre-processed data;
storing the pre-processed target data into a first dedicated processing device of the plurality of dedicated processing devices;
determining that a given dedicated processing device of the plurality of dedicated processing devices is specified to perform the at least one machine learning operation on the pre-processed data;
moving the pre-processed target data from the first dedicated processing device to the given dedicated processing device based at least in part on the determination that the given dedicated processing device of the plurality of dedicated processing devices is specified to perform the at least one machine learning operation on the pre-processed data; and
performing at least one machine learning operation on the pre-processed data using the given dedicated processing device of the server to generate machine learning output data.

6. The device according to claim 5, wherein:
the indication of the at least one pre-processing process to be performed on the target data comprises a coordination message, the coordination message indicating that a batch-processing scheme be performed on the target data; and
performing the at least one pre-processing process on the target data using the first processing device of the server to generate pre-processed data comprises processing, based at least in part on the batch-processing scheme, the target data in batches and synthesizing, based on the batch-processing scheme, the batch-processed target data.

7. The device according to claim 5, wherein the acts further comprise:
receiving, from the client device, a message that specifies the given dedicated processing device of the plurality of dedicated processing devices for performing the at least one machine learning operation on the pre-processed data, wherein determining that the given dedicated processing device of the plurality of dedicated processing devices is specified to perform the at least one machine learning operation on the pre-processed data is based at least in part on the received message; and
determining that the first dedicated processing device is different than the given dedicated processing device, wherein the moving of the pre-processed data from the first dedicated processing device to the given dedicated processing device is based at least in part on the determination that the first dedicated processing device is different than the given dedicated processing device.

8. A method of processing target data, comprising:
determining, at a client device, whether target data is to be processed by the client device, the target data being predetermined to be obtained by the client device from a storage device comprising a repository of data for use in machine learning operations; and in response to determining that the target data is not to be processed by the client device, sending, from the client device to a server, a request for processing the target data, the request comprising an indication of at least one pre-processing process to be performed on the target data by the server, wherein the server is configurable, based at least in part on the request:
- to obtain the target data from the storage device;
- to perform the at least one pre-processing process on the target data using a first processing device of the server to generate pre-processed data;
- to store the pre-processed target data into a first dedicated processing device of a plurality of dedicated processing devices of the server that are different than the first processing device;
- to determine that a given dedicated processing device of the plurality of dedicated processing devices is specified to perform the at least one machine learning operation on the pre-processed data;
- to move the pre-processed target data from the first dedicated processing device to the given dedicated processing device based at least in part on the determination that the given dedicated processing device of the plurality of dedicated processing devices is specified to perform the at least one machine learning operation on the pre-processed data; and
- to perform at least one machine learning operation on the pre-processed data using the given dedicated processing device of the server to generate machine learning output data; and obtaining, from the server, the generated machine learning output data;
wherein the method is performed by at least one processing device of the client device comprising at least one processor coupled to memory.

9. The method according to claim 8 wherein:
the indication of the at least one pre-processing process to be performed on the target data comprises a coordination message, the coordination message indicating that a batch-processing scheme be performed on the target data; and
performing the at least one pre-processing process on the target data using the first processing device of the server to generate pre-processed data comprises processing, based at least in part on the batch-processing scheme, the target data in batches and synthesizing, based on the batch-processing scheme, the batch-processed target data.

10. The method according to claim 8, wherein the method further comprises:
sending, to the server, a message that specifies the given dedicated processing device of the plurality of dedicated processing devices for performing the at least one machine learning operation on the pre-processed data, wherein determining that the given dedicated processing device of the plurality of dedicated processing devices is specified to perform the at least one machine learning operation on the pre-processed data is based at least in part on the received message, the server being further configurable to;
determine that the first dedicated processing device is different than the given dedicated processing device, wherein the moving of the pre-processed data from the first dedicated processing device to the given dedicated processing device is based at least in part on the determination that the first dedicated processing device is different than the given dedicated processing device.

11. A computer program product being tangibly stored on a non-transient computer readable medium and comprising machine executable instructions which, when being executed, causing a machine to perform steps of the method according to claim 8.

12. A device for processing target data, comprising at least one processing unit, and at least one memory coupled to the at least one processing unit and storing instructions to be executed by the at least one processing unit, the instructions, when being executed by the at least one processing unit, causing the device to perform steps of claim 8.

13. The method according to claim 1, wherein the first processing device comprises a central processing unit of the server and the plurality of dedicated processing devices comprise at least one graphics processing unit of the server.

14. The device according to claim 5, wherein the first processing device comprises a central processing unit of the server and the plurality of dedicated processing devices comprise at least one graphics processing unit of the server.

15. The method according to claim 8, wherein the first processing device comprises a central processing unit of the server and the plurality of dedicated processing devices comprise at least one graphics processing unit of the server.

16. The method according to claim 1, wherein:
the repository of data stored in the storage device comprises a repository of training data; and
the at least one machine learning operation comprises a training operation.

17. The device according to claim 5, wherein:
the repository of data stored in the storage device comprises a repository of training data; and
the at least one machine learning operation comprises a training operation.

18. The method according to claim 8, wherein:
the repository of data stored in the storage device comprises a repository of training data; and
the at least one machine learning operation comprises a training operation.

* * * * *

UNITED STATES PATENT AND TRADEMARK OFFICE
CERTIFICATE OF CORRECTION

PATENT NO. : 10,897,514 B2  
APPLICATION NO. : 16/422535  
DATED : January 19, 2021  
INVENTOR(S) : Junping Zhao et al.

Page 1 of 1

It is certified that error appears in the above-identified patent and that said Letters Patent is hereby corrected as shown below:

In the Claims

Claim 1, Column 15, Line 4, please delete "pre-processed target data" and insert therefor --pre-processed data--

Claim 1, Column 15, Line 11, please delete "pre-processed target data" and insert therefor --pre-processed data--

Claim 5, Column 16, Line 17, please delete "pre-processed target data" and insert therefor --pre-processed data--

Claim 5, Column 16, Line 24, please delete "pre-processed target data" and insert therefor --pre-processed data--

Claim 8, Column 17, Line 18, please delete "pre-processed target data" and insert therefor --pre-processed data--

Claim 8, Column 17, Line 26, please delete "pre-processed target data" and insert therefor --pre-processed data--

Signed and Sealed this  
Twenty-third Day of March, 2021

Drew Hirshfeld  
*Performing the Functions and Duties of the*  
*Under Secretary of Commerce for Intellectual Property and*  
*Director of the United States Patent and Trademark Office*